United States Patent [19]

Clark

[11] Patent Number: 4,869,030
[45] Date of Patent: Sep. 26, 1989

[54] PORCH ADAPTED FOR USE WITH A MOBILE LIVING UNIT

[75] Inventor: Lovine L. Clark, P.O. Box 146, Optima, Okla. 73948

[73] Assignee: Lovine L. Clark, Optima, Okla.

[21] Appl. No.: 186,039

[22] Filed: Apr. 25, 1988

[51] Int. Cl.⁴ .............................................. E04H 1/00
[52] U.S. Cl. ........................................ 52/79.6; 52/67; 296/162; 182/88
[58] Field of Search ........................... 52/67, 79.6, 64; 296/162; 182/88

[56] References Cited

U.S. PATENT DOCUMENTS

| | | |
|---|---|---|
| 1,170,711 | 2/1916 | Trombley . |
| 2,145,647 | 1/1937 | Evans . |
| 2,706,132 | 4/1955 | Chaffin . |
| 2,786,710 | 3/1957 | Chapman . |
| 3,008,533 | 11/1961 | Haberle . |
| 3,073,467 | 1/1963 | Parks . |
| 3,341,223 | 9/1967 | Wampfler . |
| 3,512,315 | 5/1970 | Vitalini ....................... 52/67 |
| 3,515,406 | 6/1970 | Endsly, Jr. ................. 296/162 X |
| 3,672,311 | 6/1972 | Duba et al. . |
| 3,796,456 | 3/1974 | Bergeson et al. .......... 182/88 X |
| 4,058,228 | 11/1977 | Hall ............................ 182/88 X |
| 4,188,057 | 2/1980 | Pauli .............................. 296/162 |
| 4,347,638 | 9/1982 | Weaver ...................... 182/88 X |
| 4,413,855 | 11/1983 | Flanagan ................. 52/79.6 X |

*Primary Examiner*—Carl D. Friedman
*Attorney, Agent, or Firm*—Dunlap, Codding, Peterson & Lee

[57] ABSTRACT

A porch adapted for use with a mobile living unit. The porch is moveable from a traveling position wherein the base is disposed generally under the mobile living unit to a support position wherein the base extends a distance from one side of the mobile living unit.

17 Claims, 7 Drawing Sheets

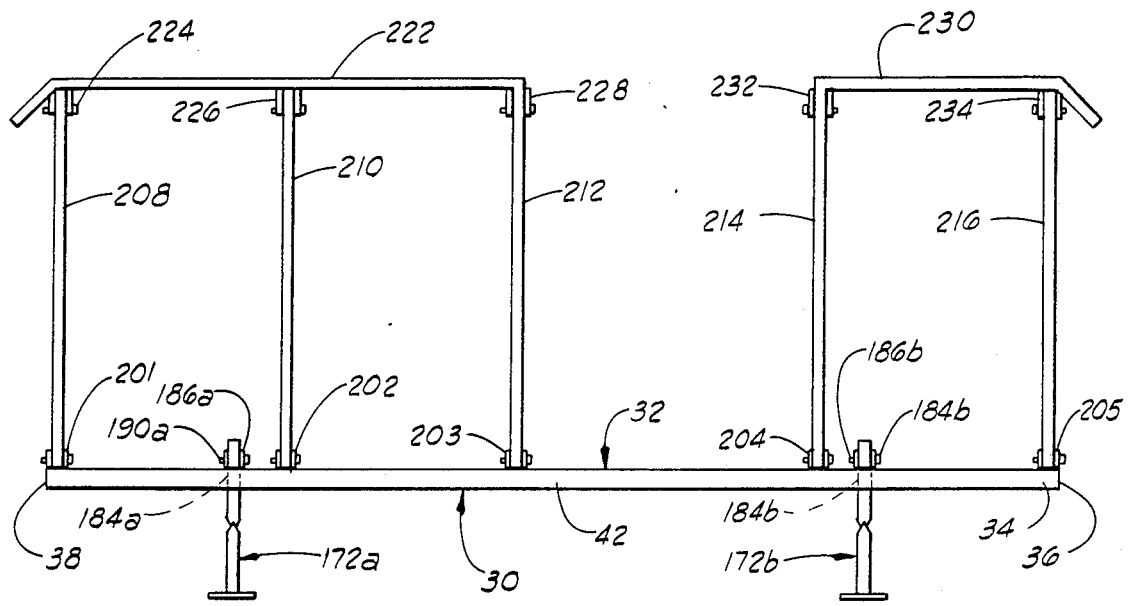
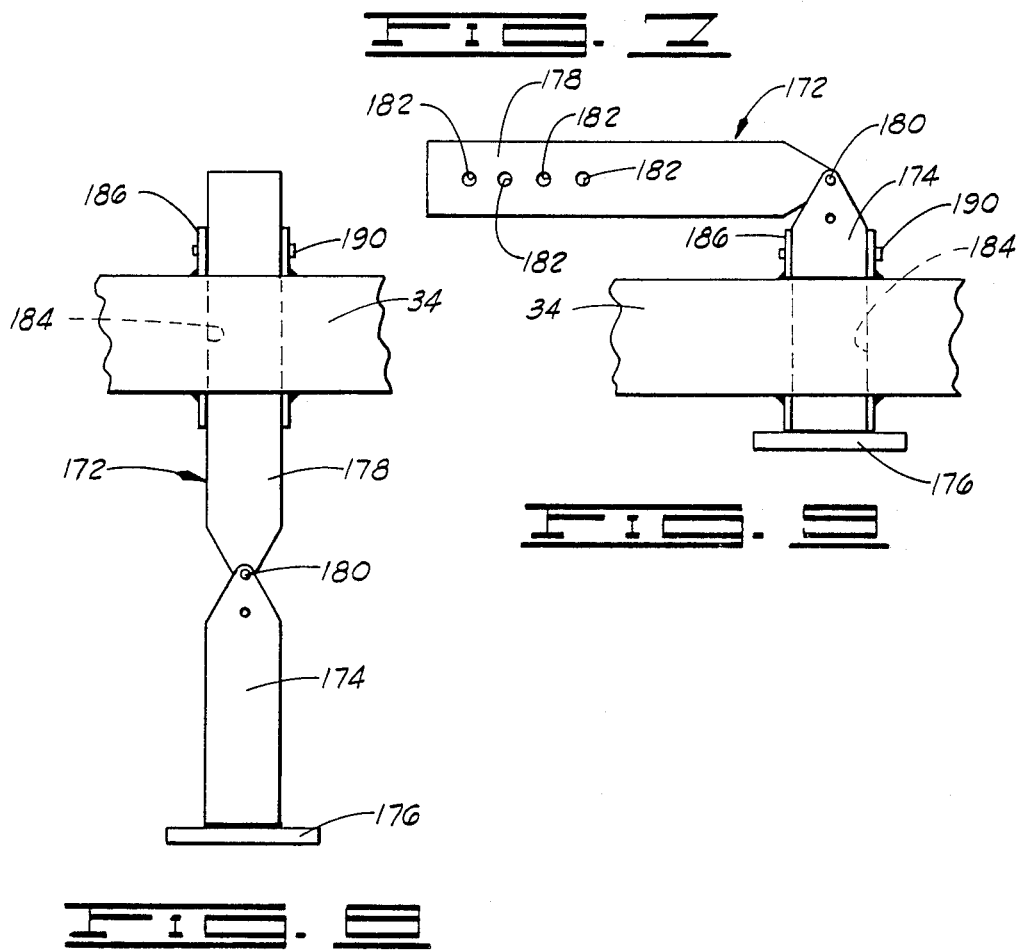

PORCH ADAPTED FOR USE WITH A MOBILE LIVING UNIT

FIELD OF THE INVENTION

The present invention generally relates to porches adapted for use with a mobile living unit and, more particularly, but not by way of limitation, to a porch which is movably connectable to the mobile living unit for movement to a support position wherein the porch is adapted and positioned to support an individual and to a traveling position wherein the porch is disposed generally under the lower surface of the mobile living unit.

BRIEF DESCRIPTION OF THE DRAWINGS

FIG. 5 is a perspective view showing of a portion of the support assembly for movably connecting the porch to the lower surface of the mobile living unit.

FIG. 6 is another perspective view of the support assembly for movably connecting the porch to the mobile living unit.

FIG. 7 is an enlarged front elevational view of the porch with the porch supports being shown in the traveling position.

DESCRIPTION OF THE PREFERRED EMBODIMENTS

Figure 1:
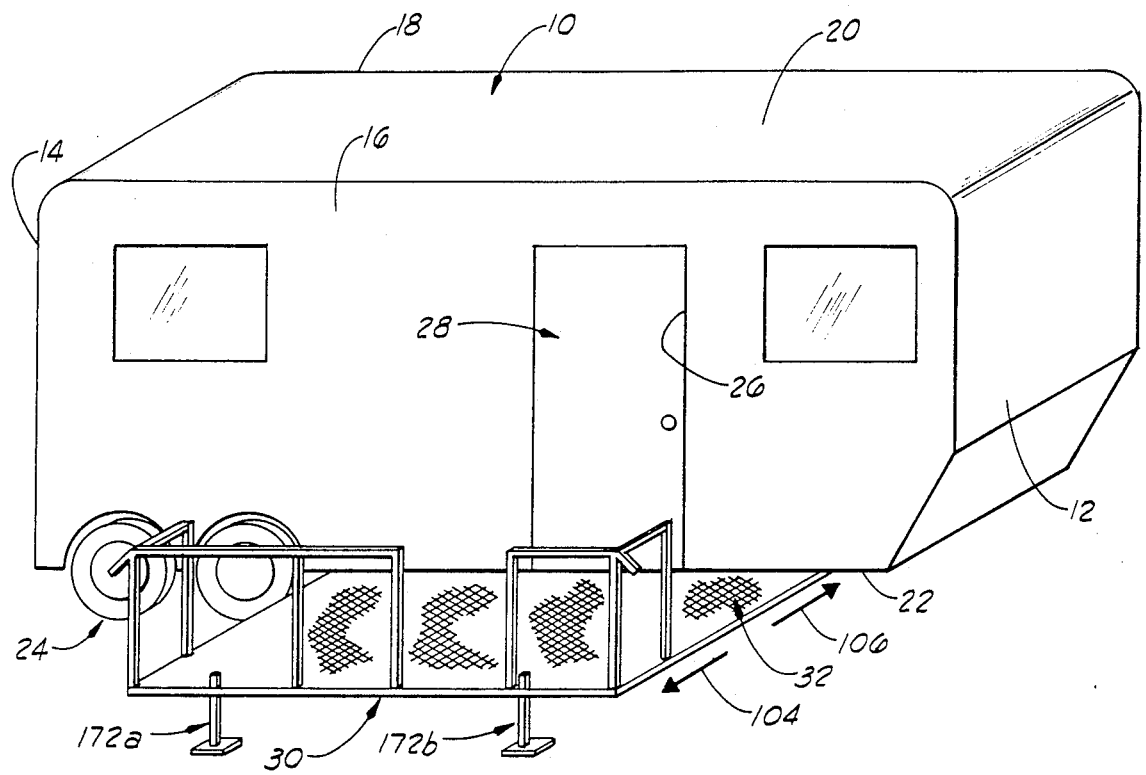
FIG. 1 is a perspective view showing a typical mobile living unit with a porch constructed in accordance with the present invention connected thereto, the porch being shown in FIG. 1 in the support position.
Figure 2:
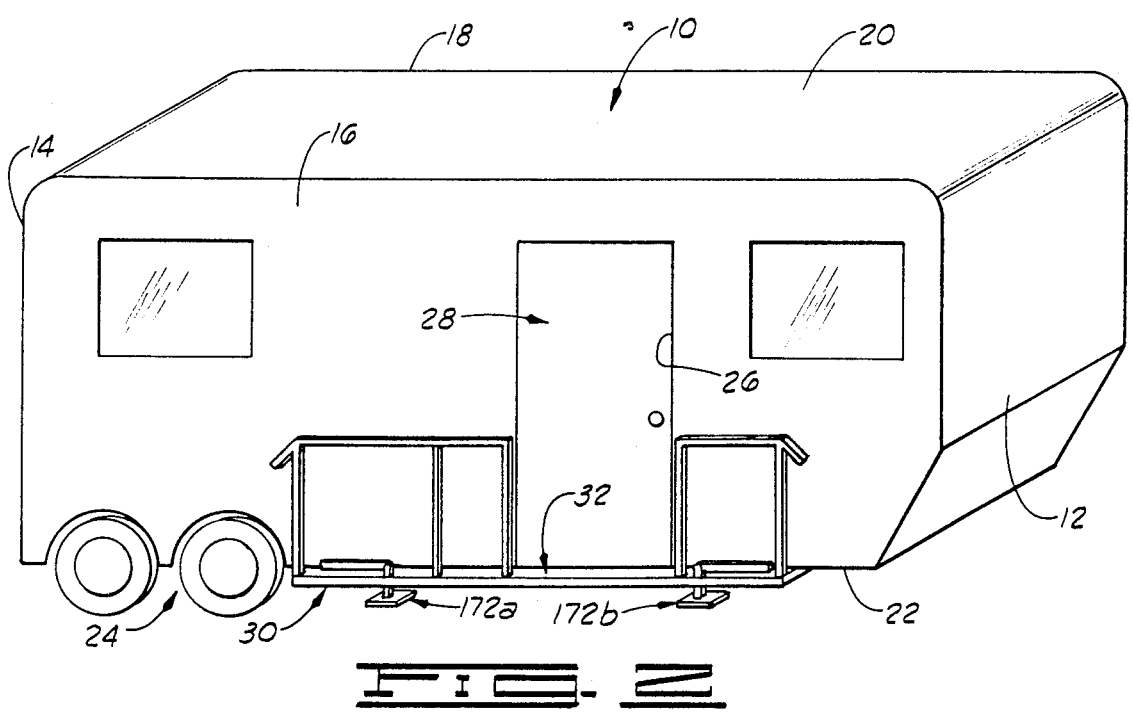
FIG. 2 is a perspective view, similar to FIG. 1, but showing the porch in a traveling position supported generally under the lower surface of the mobile living unit.

Referring to the drawings in general and to FIGS. 1 and 2 in particular shown therein and designated by the general reference number 10 is a mobile living unit. The term "mobile living unit" as used herein means any type of living unit which is adapted to be transported on the highway from one location to another, such as, but not by way of limitation, mobile living units of the type commonly referred to as "mobile homes", "motor homes", "travel trailers" and the like.

The mobile living unit 10 includes a front end 12, a rear end 14, a first side 16, a second side 18, an upper surface 20, and a lower surface 22. The mobile living unit 10 is rollingly supported by wheel assembly 24 adapted to rollingly support the mobile living unit 10 so that the lower surface 22 is disposed a distance above ground level in the traveling position of the mobile living unit 10.

The mobile living unit 10 also includes an access opening 26 sized and adapted so that individuals can enter the mobile living unit 10 through the access opening 26 or leave the mobile living unit 10 through the access opening 26. A door 28 is movably connected to the mobile living unit 10 and has an opened position (not shown) providing access to the access opening 26 and a closed position shown in FIGS. 1 and 2 obstructing or preventing access to the access opening 26.

As shown in FIGS. 1 and 2, a porch 30 which is constructed in accordance with the present invention is movably connected to the mobile living unit 10. The porch 30 includes a support surface 32 which is adapted to support an individual thereon. The porch 30 is movable to a support position, as shown in FIG. 1, wherein the support surface 32 extends a distance outwardly from the first side 16 of the mobile living unit 10 and is positioned with respect to the mobile living unit 10 for supporting an individual standing or sitting on the support surface 32. The porch 30 also is movable to a traveling position, as shown in FIG. 2, wherein the porch 30 substantially is disposed and supported generally under the lower surface 22 of the mobile living unit 10 so that the porch 30 does not provide an obstruction when the mobile living unit 10 is traveling on a road or highway.

The porch 30 is disposed generally between the front end 12 and the rear end 14 of the mobile living unit 10. More particularly, the porch 30 is disposed generally in front of the door 28 so that, in the traveling position of the porch 30, the support surface 32 extends a distance generally outwardly from the door 28 and a distance generally from each side of the door 28 in the traveling position of the porch 30.

Figure 3:
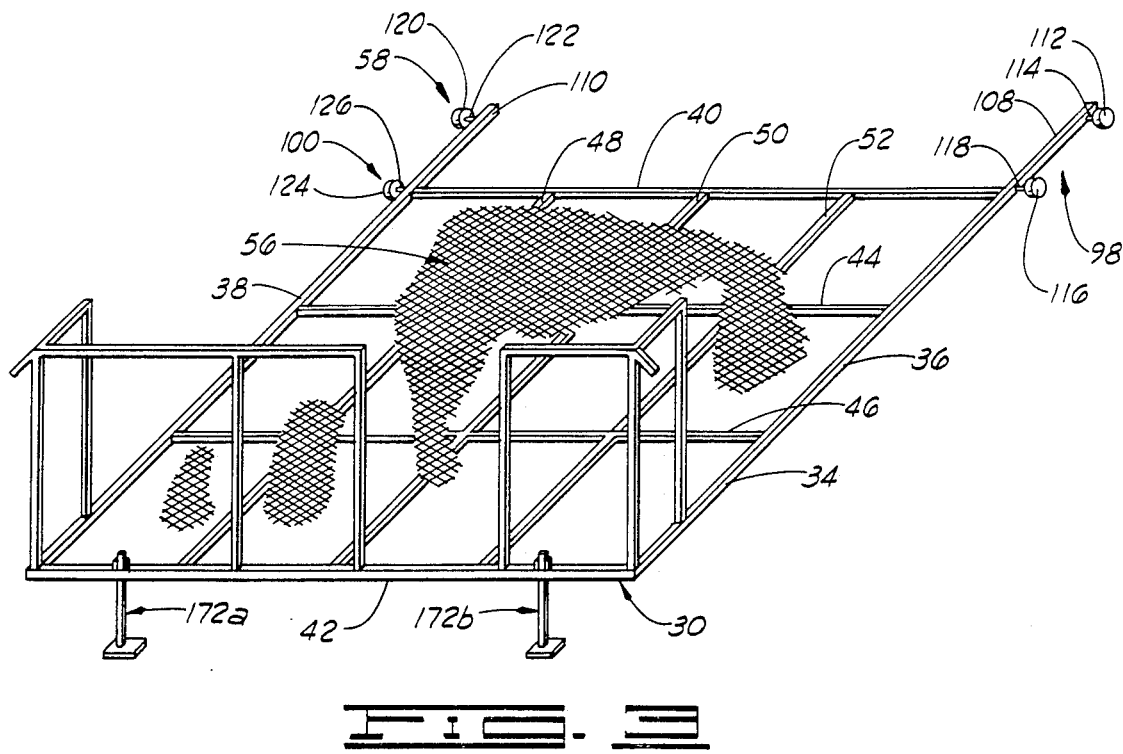
FIG. 3 is a perspective view of the porch shown in FIGS. 1 and 2.
Figure 4:
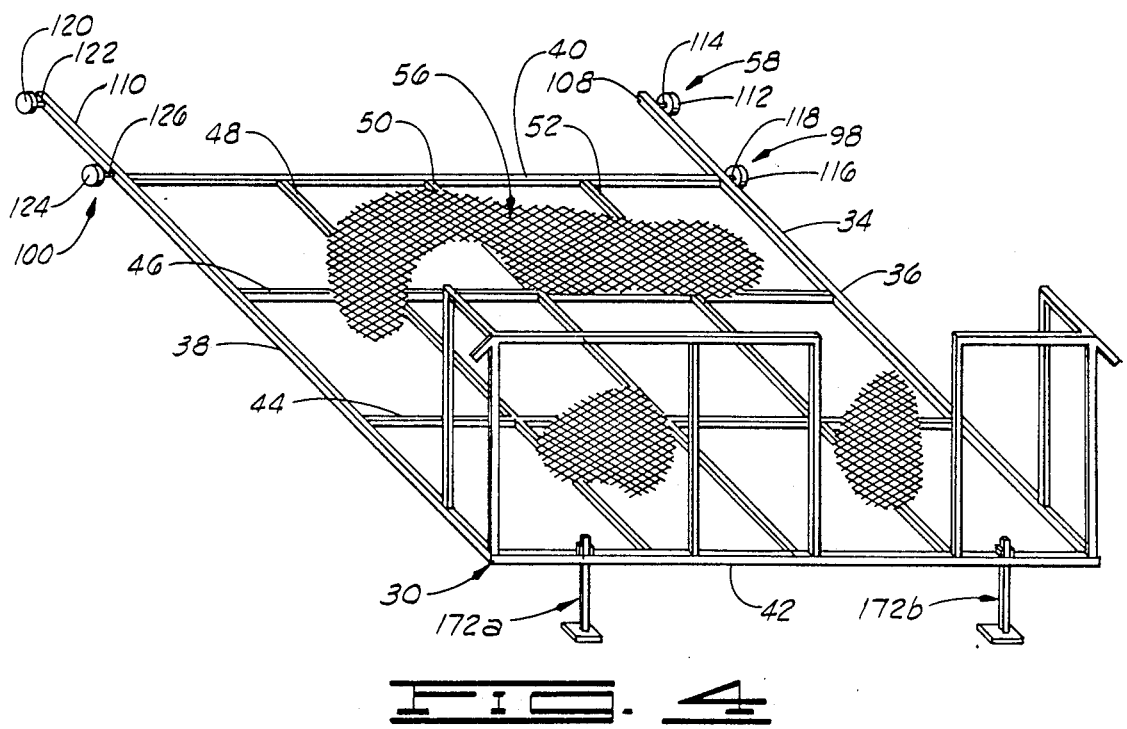
FIG. 4 is another perspective view of the porch.

As shown more clearly in FIGS. 3 and 4, the porch 30 includes a base 34 having a first side 36, a second side 38, a first end 40 and a second end 42. The sides 36 and 38 and the ends 40 and 42 are interconnected to form a basically rectangularly shaped frame. Two structuraly supports 44 and 46 are connected to the frame so that the structural supports 44 and 46 extend generally between the first and the second sides 36 and 38. Three structural supports 48, 50 and 52 are connected to the base 34 so that the structural supports 48, 50 and 52 each extend generally between the first and second ends 40 and 42. The structural supports 44, 46, 48, 50, 52 and 54 cooperate with the sides 36 and 38 and the ends 40 and 42 to form the base 34 and to provide the basic structural support for the porch 30.

An expanded metal member 56 is disposed on the base 34 and the expanded metal member 56 extends generally between the first and the second sides 36 and 38 and generally between the first and the second ends 40 and 42 of the base 34. The expanded metal member 56 is supported on the sides 36 and 38, the ends 40 and 42 and the structural members 44, 46, 48, 50, 52 and 54. The expanded metal member 56 forms the support surface 32 for the porch 30.

As shown in FIGS. 3, 4, 5 and 6, the porch 30 also includes a porch support assembly 58 which includes a portion connected to the base 34 and another portion connected to the lower surface 22 of the mobile living unit 10 for movably connecting the porch 30 to the mobile living unit 10 so that the porch 30 can be moved to the support position and to the traveling position.

Figure 6A:
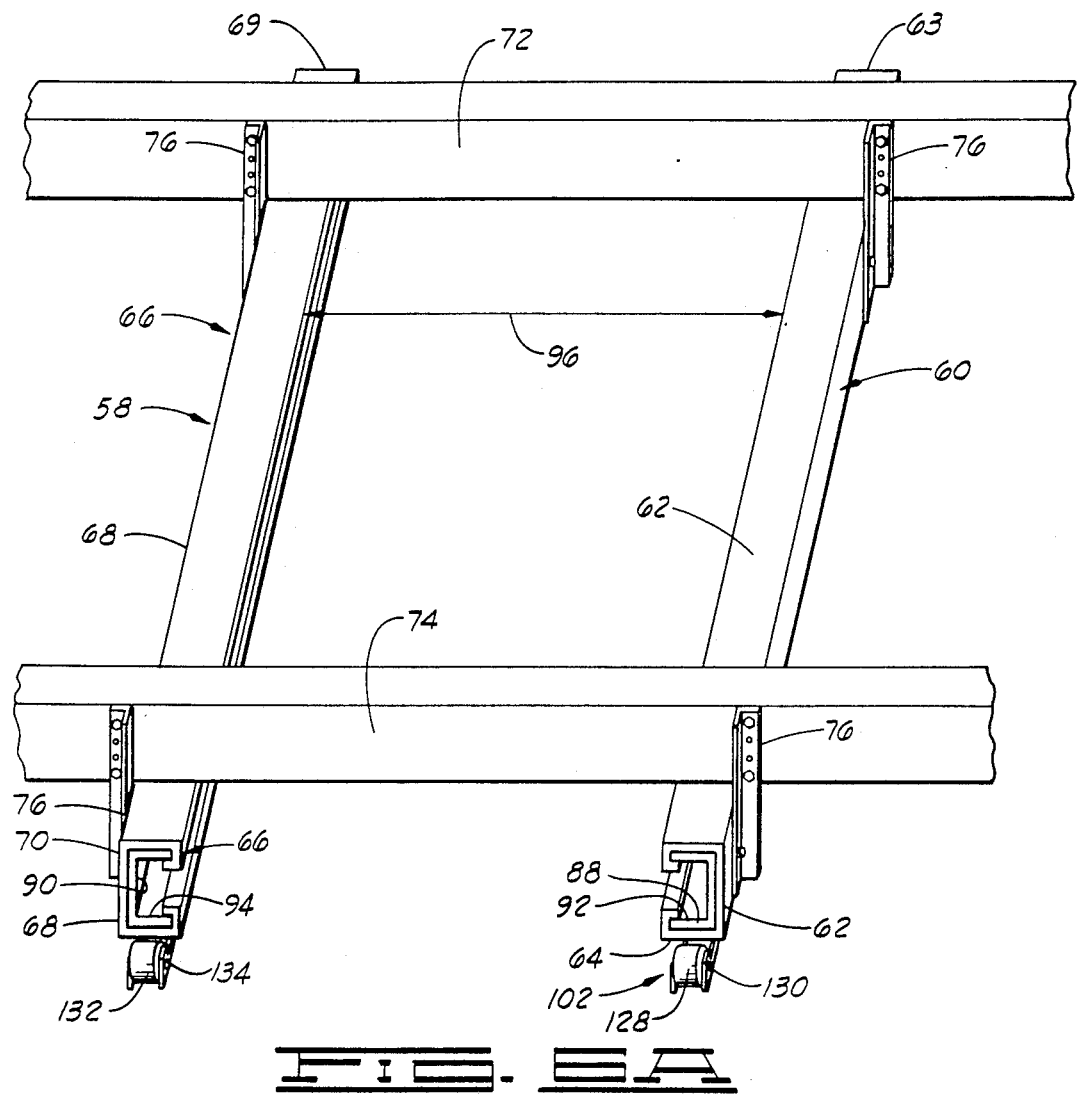
FIG. 6A is a perspective view showing the first and second roller guides of the porch support assembly connected to the frame members of the mobile living unit.

As shown in FIG. 6A and as shown in FIGS. 5 and 6, the porch support assembly 58 includes a first roller guide 60 which is connectable to the lower surface 22 of the mobile living unit 10 and extends a distance generally between the first and the second sides 16 and 18 of the mobile living unit 10. The first roller guide 60 comprises a channel 62. The channel 62 has a first end 63 and a second end 64.

The porch support assembly 58 includes a second roller guide 66 which is connectable to the lower surface 22 of the mobile living unit 10 and extends a distance generally between the first and the second sides 16 and 18 of the mobile living unit 10. The second roller guide 66 comprises a channel 68. The channel 68 has a first end 69 and a second end 70.

Different views of a typical roller guide 60 or 66 is shown in greater detail in FIGS. 5 and 6. As shown in FIG. 6A, the mobile living unit 10 includes at least two spaced apart frame members 72 and 74. The frame member 72 is disposed generally near the first sides 16 and extends generally between the front and the rear ends 14 and 16 of the mobile living unit 10. The frame member 74 is disposed generally near the second side 18 and extends generally between the front and rear ends 12 and 14 of the mobile living unit 10. The frame member 72 and 74 generally are in the form U-shaped channels and the frame members 72 and 74 comprise a portion of the existing mobile living unit 10.

The first and the second roller guides 60 and 66, more particularly, are connected to the frame members 72 and 74.

As shown more clearly in FIG. 5, the porch support assembly 58 includes four brackets 76. One of the brackets 76 is connected to the frame member 72 and to the first roller guide 60 and one of the brackets 76 is connected to the frame member 74 and to the first roller guide 60 for cooperating to support the first roller guide 60 on the frame members 72 and 74. One of the brackets 76 is connected to the frame member 72 and to the second roller guide 66 and one of the other bracket 76 is connected to the frame member 74 and to the second roller guide 66 for cooperating to support the second roller guide 66 on the frame members 72 and 74.

The bracket 76 is identical in construction. As shown more clearly in FIGS. 5 and 6, each bracket 76 includes a L-shaped bar 78 having a first and a second end 80 and 82. A plurality of spaced apart holes 84 are formed through the L-shaped bar 78 with the holes 84 being disposed generally near and spaced a distance from the first end 80.

The first end 80 portion of the L-shaped bar 78 is secured to one of the frame members 72 or 74 with a pair of bolts 86 extending through one of the holes 84 and through the frame member 72 or 74. The spaced apart holes 84 provide a convenient means for adjusting the position of the L-shaped bar 78 on the frame members 72 and 74 thereby providing a means for adjusting the position of the first and the second roller guides 60 and 66.

A track 88 is disposed in the channel 62 with the track 88 extended generally between the ends of the first roller guide 60. A track 90 is disposed in the channel 68 of the second roller guide 66 with a track 90 extending generally between the opposite ends of the second roller guide 66. The track 88 provides a track surface 92 extending generally the length of the first roller guide 60 generally between the opposite ends of the first roller guide 60. The track 90 provides a track surface 94 in the second roller guide 66 extending generally between the opposite ends of the second roller guide 66.

The first roller guide 60 is spaced a distance 96 from the second roller guide 66. The base 34 of the porch 30 is disposed generally between the first and the second roller guides 60 and 66.

As shown in FIGS. 3 and 4, a first roller assembly 98 includes a portion connected to the first side 36 of the base 34 another portion rollingly engaging a portion of the first roller guide 60. A second roller assembly 100 includes a portion connected to the second side 38 of the base and another portion rolling engaging a portion of the second roller guide 66.

As shown in FIG. 6A, a third roller assembly 102 includes portions connected to a front end portions of the first and the second roller guides 60 and 66 and other portions rollingly connected to the portions of the base 34. The roller assemblies 98, 100 and 102 cooperate to rollingly support the base 34 on the first and the second roller guides 60 and 66 for movement of the base 34 in a direction 104 (FIG. 1) from the traveling position to the support position and for movement in a direction 106 (FIG. 1) from the support position to the traveling position of the base 34.

As shown more clearly in FIGS. 3 and 4, the base 34 includes a first base extension member 108 having one end connected to the first end 40 of the base 34 generally adjacent the first side 36 of the base 34 so that the first base extension member 108 is generally aligned with the first side 36 of the base 34. The first base extension member 108 extends a distance from the first end 40 of the base 34.

One end of a second base extension member 110 one end is connected to the first end 40 of the base 34 generally adjacent the second side 38 of the base 34 so that the second base extension member 110 is generally aligned with the second side 38 of the base 34. The second base extension member 110 extends a distance from the first end 40 of the base 34.

The first roller assembly 98 includes a first roller 112 generally supported on one end of a shaft 114 with the opposite end of the shaft 114 being secured to the first base extension member 108 generally adjacent the end of the first base extension member 108, opposite the end connected to the base 34. The first roller 112 is rollingly supported on the shaft 114.

The first roller assembly 98 also includes a second poller 116 rollingly supported on one end of the shaft 118 with the opposite end of the shaft 118 being connected to the first base extension member 108 at a position spaced a distance from the first roller 112. The second roller 116 is rollingly supported on the shaft 118.

The first and the second rollers 112 and 116 are disposed in the first roller guide 60 and rollingly supported generally on the track surface 92.

The third roller assembly 102 includes a first roller 120 generally supported on one end of a shaft 122 with the opposite end of the shaft 122 being secured to the second base extension member 110 generally adjacent the end of the second base extension member 110, opposite the end connected to the base 34. The first roller 120 is rollingly supported on the shaft 122.

The third roller assembly 102 also includes a second roller 124 rollingly supported on one end of a shaft 126 with the opposite end of the shaft 126 being connected to the second base extension member 110 at a position spaced a distance from the first roller 120. The second roller 124 is rollingly supported on the shaft 126.

The first and the second rollers 120 and 124 are rollingly disposed in the second roller guide 66 and rollingly supported on the track surface 94.

In an assembled position, the base 34 is disposed between the first and the second roller guides 60 and 66 and positioned so the first and the second rollers 112 and 116 each are rollingly disposed within the track 88 and the first and the second rollers 124 and 128 of the second roller assembly 100 each are disposed generally within the track 90.

As shown more clearly in FIG. 6A, the third roller assembly 102 includes a first roller 128 which is rolling supported on a shaft 130. The shaft 130 is connected to the first roller guide 60 generally near the end 64 thereof. The first roller 128 is positioned to rolling engage the lower side of the base 34 generally adjacent first side 36 thereof.

The third roller assembly 102 includes a second roller 132 which is rollingly supported on a shaft 134. The shaft 134 is connected to the second roller guide 66 generally near the end 70 thereof. The second roller 132 is positioned to rollingly engage the lower side of the base 34 generally adjacent the second side 38 thereof. The rollers 112, 116, 120, 124, 128 and 132 each cooperate to rollingly support the base 34 on the first and the second roller guides 60 and 66.

The rollers 116 and 128 are disposed in about the same plane and the rollers 124 and 132 are disposed in about the same plane so that, in the traveling position of the base 34, the base 34 is rolling supported in the first and second roller guides 60 and 66 on the rollers 116, 128, 124 and 132. As the base 34 is moved in the direction 104 toward the weight of the second end 42 portion of the base 34 causes the base 34 to pivot generally on the rollers 128 and 132 thereby slightly raising the first end 40 of the base 34. The rollers 114 and 120 are positioned in a plane slightly above the planar disposition of the rollers 116, 128, 124 and 132 so that, when the base 34 pivots in the manner just described, the rollers 114 and 120 engage the upper portions of the tracks 88 and 90, respectively, to prevent further pivoted movement of the base 34. In this position, the rollers 114 and 120 also cooperate to rollingly support the base 34.

Figure 10:
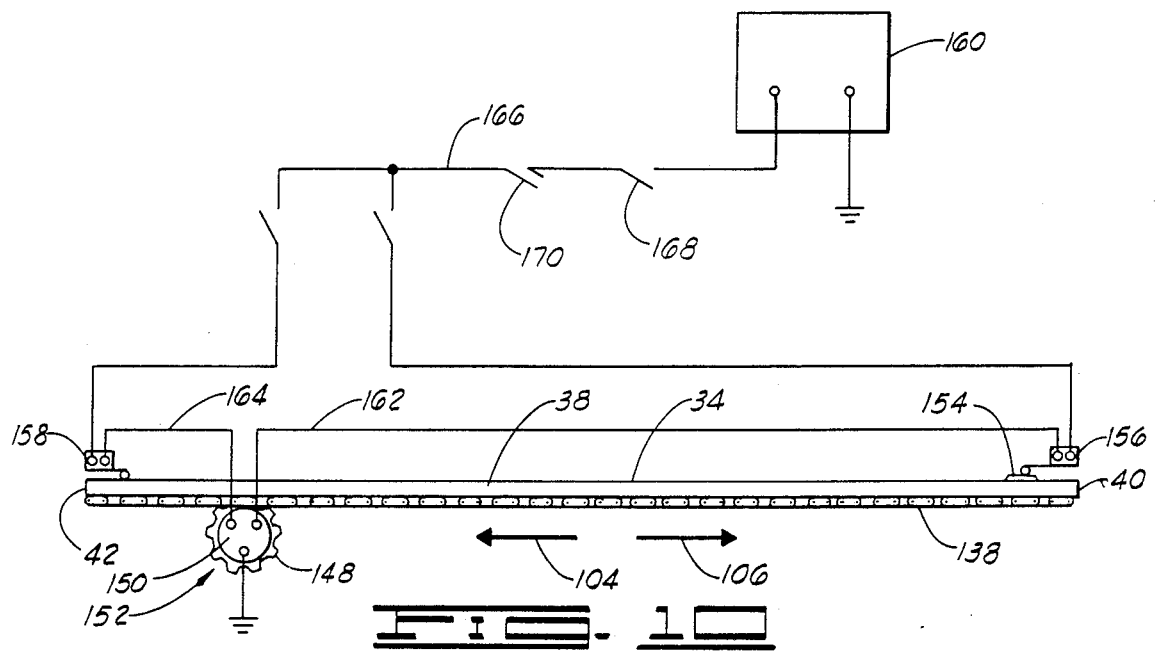
FIG. 10 is a side elevational view of the porch and a schematic view of the controls for moving the porch to the storage position and to the traveling position.
Figure 11:
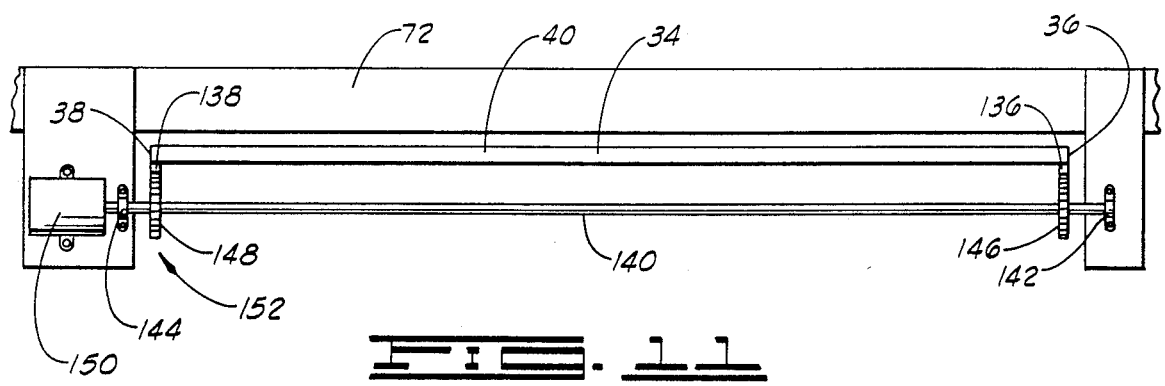
FIG. 11 is an end elevational view of the porch shown in FIG. 9 with the means for moving the porch to the support position and to the traveling position.
Figure 12:
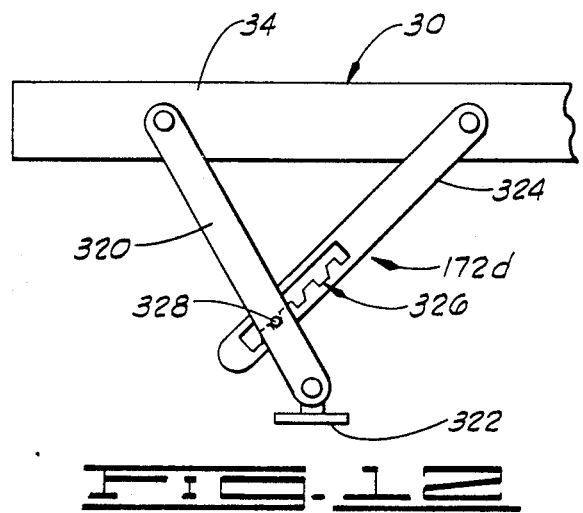
FIG. 12 is a side elevational view of a modified porch support.

As shown more clearly in FIGS. 10 and 11, first roller chain 136 is welded to the underside of the base 34 generally adjacent the first side 36 of the base 34 with the first roller chain 136 extending generally between the first and the second ends 40 and 42 of the base 34. A second roller chain 138 is welded to the underside of the base 34 generally adjacent the second side 38 of the base 34 with the second roller chain 138 extending generally between the first and the second ends 40 and 42 of the base 34.

One end of a shaft 140 is generally connected to one of the frame member 72 by way of a journal bearing support 142. The opposite end of a shaft 140 is generally connected to the frame member 72 by way of a journal bearing support 144. The shaft 140 extends generally under the base 34 and the shaft 140 extends generally between the first and the second sides 36 and 38 of the base 34.

A sprocket 146 is secured to the shaft 140 and positioned on the shaft 140 to drivingly engage the first roller chain 136. A second sprocket 148 is connected to the shaft 140 and positioned to drivingly engage the second roller chain 138. One end of the shaft 140 is connected to the output shaft of a reversible motor 150. The first and the second roller chains 136 and 138, the shaft 140 the journal bearing supports 142 and 144, the first and the second sprockets 146 and 148 and the reversible motor 150 all comprise a driving assembly 152 from drivingly moving the base 140 in the direction 104 or 106.

When the reversible motor 150 is conditioned to rotate the shaft in one direction, the first and the second sprockets 146 and 148 each drivingly engage the respective first and the second roller chain 136 and 138 for drivingly moving the base 34 in the direction 104. When the reversible motor 150 is conditioned to drivingly rotate the shaft 140 in the opposite direction, the first and the second sprockets 146 and 148 drivingly engage the respect first and second roller chains 136 and 138 for drivingly moving the base 34 in the direction 106.

A cam structure 154 is connected to the upper surface of the base 34 generally adjacent the second side 38 of the base 34 and generally near the first end 40 of the base 34. A first limit switch 156 is supported on the second roller guide 66 and positioned on the second roller guide 66 to engage the cam structure 154 when the base 34 has been moved in the direction 106 to the traveling position of the base 34. A second limit switch 158 is connected to the first roller guide 60 and positioned on the first roller guide 60 to engage the cam structure 154 when the base 34 has been moved in the direction 104 to the support position of the base 34.

The motor 150 is connected to a power source 160 through the first and second limit switches 156 and 158 by way of a pair of conductors 162 and 164. The conductors 162 and 164 each are connectable to a conductor 166 which is connected to the positive side of the power source 160. A master switch 168 is interposed in the conductor 166 and a trailer door safety switch 170 also is interposed in the conductor 166.

The trailer door safety switch 170 is operatively associated with the door 28 of the mobile living unit 10 so that the trailer door safety switch 170 is closed when the trailer door 28 is closed and such that the trailer door safety switch 170 is opened when the door 28 of the mobile living unit 10 is opened. Thus, if the door 28 of the mobile living unit 10 is opened, the trailer door safety switch 170 is opened and the motor 150 can not be connected to the power source 160 for drivingly moving the base 34 in either direction 104 or 106.

Assuming the door 28 of the mobile living unit 10 is closed thereby closing the trailer door safety switch 170 and assuming the base 34 is in the traveling position as shown in FIG. 10 when the master switch 168 is closed the reversible motor 150 is connected to the power source 160 by way of the conductor 162 through the second limit switch 158. In this condition, the motor 150 is conditioned to drive the first and the second sprockets for drivingly engaging the respective first and the second roller chains 136 and 138 to move the base 34 in the direction 104 toward the support position. As the base 34 is moved in the direction 104, the first limit switch 156 is disengaged from the cam 154. The base 34 continues to move in the direction 104 and, when the base 34 is moved to the support position, the cam structure 154 engages the second limit switch 158 thereby disconnecting the motor 150 from the power source 160 so the motor 150 does not continue to drivingly move the base 34.

By the same token, assuming the base 34 is in the support position and assuming the trailer door safety switch 170 is closed indicating the door 28 of the mobile living unit 10 is closed, when the master switch 168 then is closed, the power source 160 is connected to the motor through the first limit switch 156. In this condition, the motor 150 drivingly rotates the sprockets 146 and 148 for drivingly engaging the first and the second roller chains 136 and 138 respectively for moving the base 34 in the direction 106 toward the traveling position of the base. As the base 34 moves in the direction 106, the second limit switch 158 is disengaged from the cam structure 154. When the base 34 has moved in the direction 106 to the traveling position of the base 34, the cam structure 154 engages the first limit switch 156 thereby disconnecting the power source 160 from the motor 150 so the motor 150 ceases to drivingly move the base 34.

The cam structure 154, the limit switches 156 and 158, the power source 160, the master switch 168 and the trailer door safety switch 170 also comprise portions of the drivingly assembly 152.

The driving assembly 152 provides a means for automatically moving the base 154 to the support position or to the traveling position. It should be noted that in one preferred embodiment of the invention, the porch 30 does not include a driving assembly such as the driving assembly 152 and, in this embodiment, the base 34 is moved by hand to the support position and to the traveling position. In one other embodiment, the drive assembly 152 could be hydraulically powered.

Figure 8:
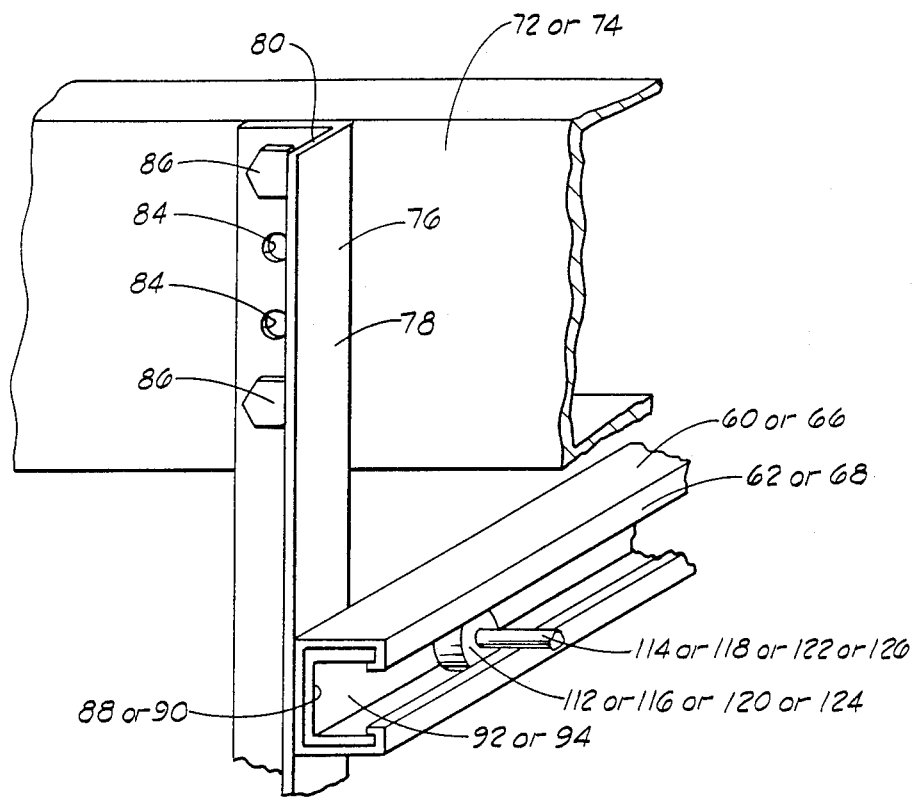
FIG. 8 is a front elevational view of a typical porch support shown in the support position.
Figure 9:
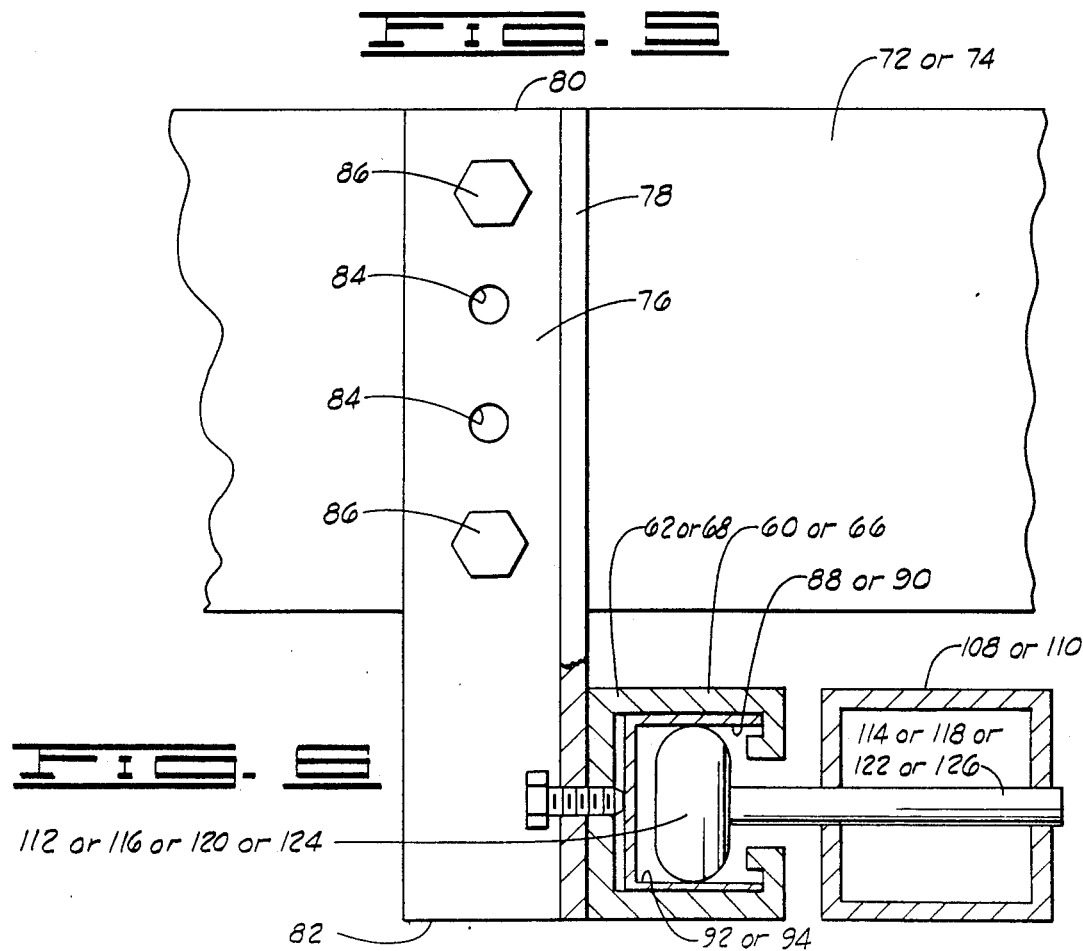
FIG. 9 is a front elevational view of the typical porch support shown in FIG. 8, but showing the porch support in the traveling position.

As shown more clearly in FIGS. 7, 8 and 9, the porch 30 includes two porch supports 172 with the porch supports 172 being designated in the drawings by the specific reference numerals 172a and 172b. The porch supports 172a and 172b are identical in constructure and a typical porch support 172 is shown in greater detail in FIGS. 8 and 9.

Each porch support 172 includes a first porch support member 174 having one end connected to a base 176 with the first porch support member 174 extending a distance generally upwardly from the base 176. One end of a second porch support member 178 is pivotally connected to one end of the first porch support member 174 by way of a pivot pin 180. A plurality of spaced apart openings 182 are formed through the second porch support member 178 generally near the end of the second porch support member 178 opposite the end connected to the first porch support member 174.

An opening 184b is formed through a portion of the base 34 generally near the second end 42 and spaced a distance from the first side 36 of the base 34. A bracket 186b is connected about the opening 134 and the bracket 186 extends a distance generally upwardly from the upper surface of the base 34. An opening (not shown) is formed through the bracket 184. The opening 184b is sized to slidingly receive the upper end portion of the second porch support member 178 of the porch support 172b. When the base 34 has been moved to the support position, the second porch support member 178 of the porch support 172b is positioned within the opening 184b so that the base 176 engages the ground surface and, in this position, a lock pin 190b is inserted through the opening in the bracket 186b and through one of the openings 182 in the porch support member 178b for securing the porch support member 178b to the base 34.

An opening 184a is formed through a portion of the base 34 generally near the second end 42 and spaced a distance from the second side 38 of the base 34. A bracket 186a is connected about the opening 184a and the bracket 186a extends a distance generally upwardly from the upper surface of the base 34. An opening (not shown) is formed through the bracket 184a. The opening is sized to slidingly receive the upper end portion of the second porch support member 178 of the porch support 172a. When the base 34 has been moved to the support position, the second porch support member 178 of the porch support 172a is positioned within the opening 184a so that the base 176 engages the ground surface and, in this position, a lock pin 190a is inserted through the opening in the bracket 186a and through one of the openings 182 in the second porch support member 178a for securing the second porch support member 178a to the base 34.

The porch supports 172a and 172b provide a means for supporting a second end 42 of the base 34 a distance generally above the ground surface in the support position of the base 34 with the first end 40 of the base 34 being supported by the first and the second base extension member 108 and 110 on the first and the second roller guides 60 and 66.

When it is desired to move the base 34 to the traveling position, the porch supports 172a and 172b are adapted to be moved to a traveling position. To move the porch supports 172a and 172b to the traveling position, the lock pins 190 and 198 are removed and the porch supports 172a and 172b each are moved in the upward direction to a position wherein the bases 176 of the porch supports 172a and 172b each are disposed generally near the lower or under surface of the base 34. In this position of the porch supports 172a and 172b, the second porch supports members 178 of each of the porch supports 172a and 172b are pivotally moved in a downward direction to a position wherein each of the second porch support members 178 of the porch support 172a and 172b are disposed generally adjacent the expanded metal member 56 or support surface 32 thereby placing each of the porch supports 172a and 172b in the traveling position.

Figures 7A, 7B:
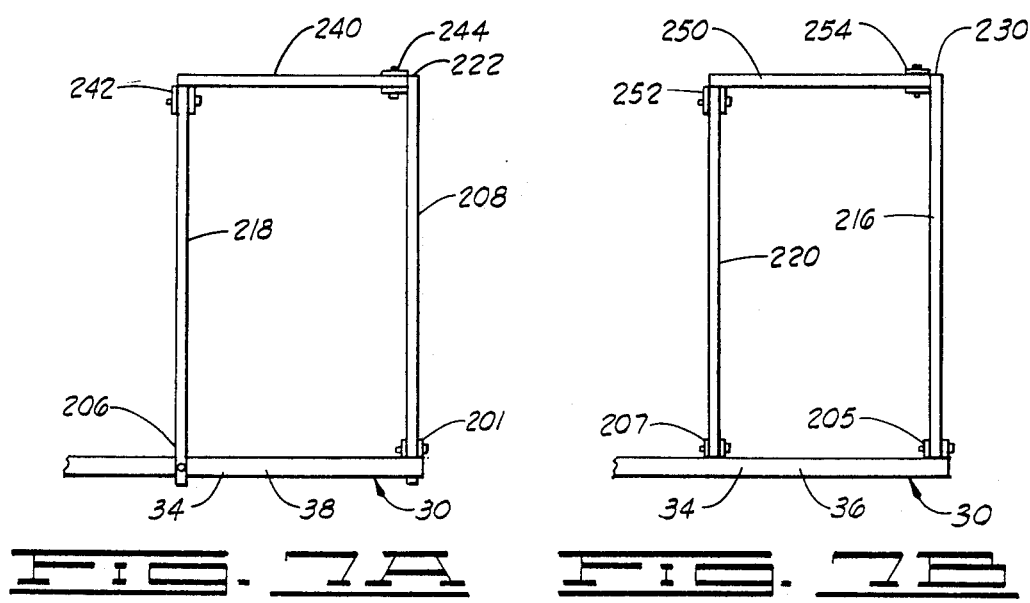
FIG. 7A is a side elevational view of the porch shown in FIG. 7.
FIG. 7B is a side elevational view showing the opposite side of the porch, opposite the side shown in FIG. 7A.

As shown more clearly in FIGS. 7, 7A and 7B, the porch 34 also includes a hand rail assembly 200 which is removably connected to the base 34 and extends a distance generally upwardly from the base 34.

The hand rail assembly 200 includes seven spaced apart brackets 201, 202, 203, 204, 205, 206 and 207. The hand rail assembly 200 also includes seven posts 208, 210, 212, 214, 216, 218 and 220. Each post 208, 210, 212, 214, 216, 218 and 220 is removably secured in one of the brackets 201, 202, 203, 204, 205, 206 and 207 by a pin. Each post 208, 210, 212, 214, 216, 218 and 220 extends a distance upwardly from the base 34.

A top rail 222 is removably secured to the posts 208, 210 and 212. The top rail 222 includes three spaced a part brackets 224, 226 and 228. The upper end of the post 208 is disposed in the bracket 224 and secured therein by a pin. The upper end of the post 210 is disposed in the bracket 226 and secured therein by a pin.

The upper end of the post 212 is disposed in the bracket 228 and secured therein by a pin.

A top rail 230 is removably secured to the posts 214 and 216. The top rail 230 include two spaced apart brackets 232 and 234. The upper end of the post 214 is disposed in the bracket 232 and secured therein by a pin. The upper end of the post 216 is disposed in the bracket 234 and secured therein by a pin.

A top rail 240 is removably secured to the posts 208 and 218, as shown in FIG. 7A. The top rail 240 includes a bracket 242. One end of the post 218 is disposed in the bracket 242 and secured therein by a pin. A bracket 244 is connected to the top rail 240 and one end of the top rail 240 is disposed in the bracket 244 and secured therein by a pin.

A top rail 250 is removably secured to the posts 216 and 222. A bracket 252 is connected to the top rail 250. The upper end of the post 220 is disposed in the bracket 252 and secured therein by a pin. A bracket 254 is connected to the top rail 230 and one end of the top rail 250 is disposed in the bracket 254 and secured therein by a pin.

Figure 13:
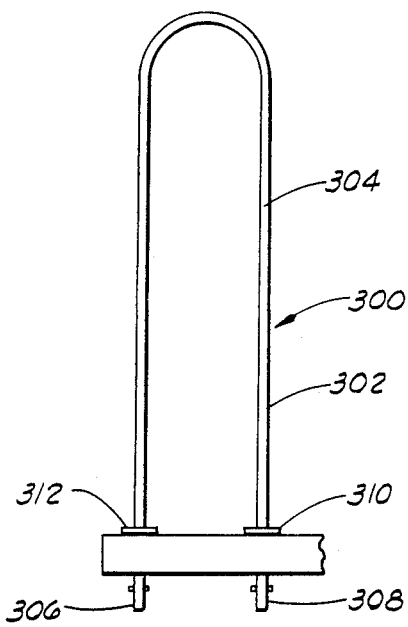
FIG. 13 is a side elevational view of a modified hand rail.
Figure 14:
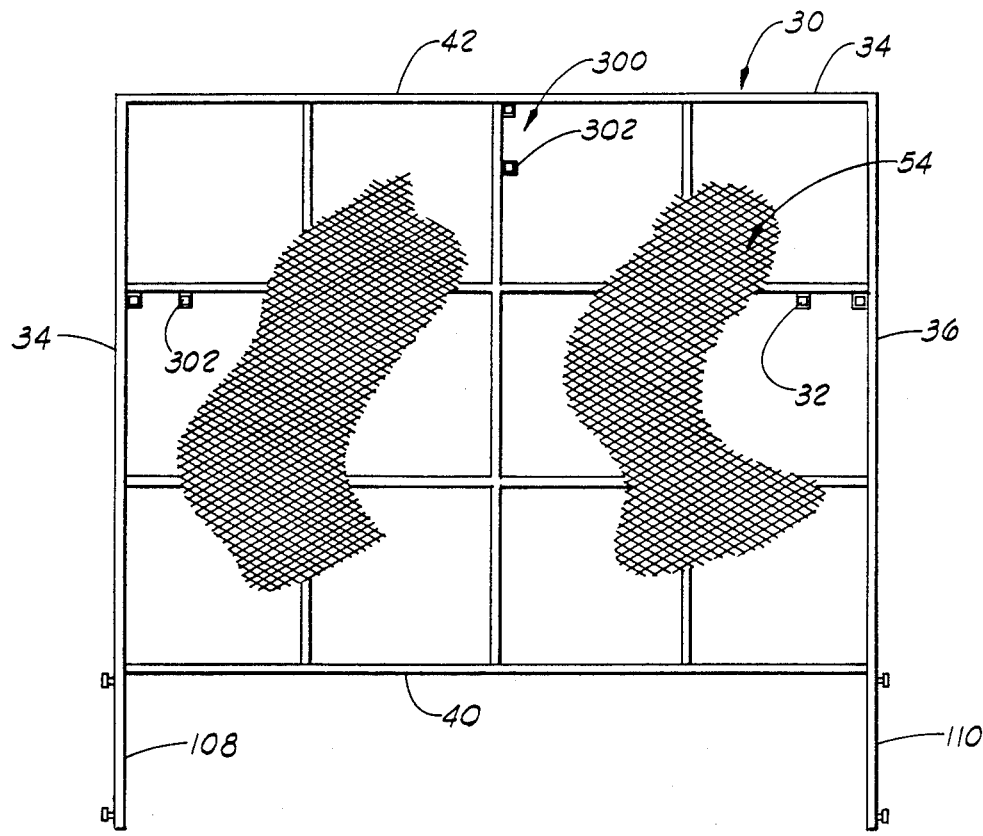
FIG. 14 is a top elevational view showing three modified hand rails as shown in FIG. 13 disposed thereon.

Shown in FIGS. 13 and 14 is an alternative hand rail assembly 300 which includes three hand rails 302. Each hand rail 302 is connected to the base 34 at various positions on the base 34 shown in FIG. 14. The hand rails 302 each are identical in construction.

As shown in FIG. 13, each hand rail 302 comprises a U-shaped rail member having opposite ends 306 and 308. At each location where one of the hand rails 308 is to be located, a pair of rail fittings 310 and 312 are disposed through the base 34 and connected to the base 34 with each of the rail fittings 310 and 312 having an opening formed therethrough.

In operation, the hand rail 302 is positioned generally above one pair of the rail fittings 310 and 312 and the hand rail 302 is moved in a downwardly direction thereby disposing the end portions 306 and 308 through the rail fittings 310 and 312. The hand rail 302 is secured in this position with pins.

The hand rail 302 is thus removably securable to the base 34 so that the hand rail 302 can be removed from the base 34 when the base 34 is to be moved to the traveling position.

Shown in FIG. 13 is a modified porch support 172d. The modified porch support 172d includes a first arm 320 having one end thereof pivotally connected to the base 34. A base 322 is pivotally connected to the end of the first arm 320 opposite the end of the first arm 320 which is connected to the base 34.

The porch support 172d also includes a second arm 324 having one end pivotally connected to the base 34. A series of serrations 326 are formed on the second arm 324.

When it is desired to move the porch support 172d to the operating position wherein the porch support 172d supports the second end 42 portion of the base 34, the first arm 320 is pivotally moved to a position wherein the base 322 engages the ground level. The second arm 324 then is pivotally moved to a position wherein one end portion of the second arm 324 is disposed generally adjacent a portion of the first arm 320. In this position of the first and the second arms 320 and 324, a lock pin 328 is disposed through openings in the first and the second arms 320 and 324 with the lock pin 328 being disposed generally within one of the serrations 326 thereby securing the first arm 320 to the second arm 324 and securing the first and the second arms 320 and 324 in an operating position for cooperating to support a portion of the second end 42 of the base 34 in the support position.

It should be noted that, in some applications, it may be desireable to connect the porch to the mobile living unit so the porch extends from one end of the mobile living unit in a support position. The term first side of the mobile living unit as used in the claims is intended to encompass this embodiment with the term side being considered broad enough to refer to an end of the mobile living unit as that term is used in conjunction with the illustration of a mobile living unit in FIGS. 1 and 2.

Changes may be made in the construction and operation of the various components, assemblies and elements described herein without departing from the spirit and the scope of the invention as defined in the following claims.

I claim:

1. A porch adapted for use with a mobile living unit having a front end, a rear end, a first side, a second side, an upper surface and a lower surface wherein the lower surface is supported a distance above ground level in a traveling condition of the mobile living unit, the porch comprising:

a base having a first side, a second side, a first end and a second end, a support surface being formed on the base extending generally between the first side and the second side and generally between the first end and the second end; and means for rollingly connecting the base to the lower surface of the mobile living unit, the base being movable from a support position to a traveling position wherein the base substantially is disposed under the lower surface of the mobile living unit and the base being movable from the traveling position to a support position wherein the base extends a distance from the first side of the mobile living unit with the support surface on the base being position for supporting an individual thereon, comprising:

a first roller guide having a first end and a second end connectable to the lower surface of the mobile living unit and extending a distance generally between the first and the second sides of the mobile living unit; the first end of the first roller guide being disposed near the second side of the mobile living unit and the second end of the first roller guide being disposed near the first side of the mobile living unit;

a second roller guide having a first end and a second end connectable to the lower surface of the mobile living unit and extending a distance generally between the first and the second sides of the mobile living unit, the second roller guide being spaced a distance from the first roller guide, the first end of the second roller guide being disposed near the second side of the mobile living unit and the second end of the second roller guide being disposed near the first side of the mobile living unit;

a first roller assembly having a portion connected to the first side of the base and another portion rollingly engaging a portion of the first roller guide;

a second roller assembly having a portion connected to the second side of the base and another portion rolling engaging a portion of the second roller guide, the first and the second roller assembly rolling cooperating for supporting the base on the first and the second roller guide so the base is rollingly movable from the traveling position to the support position and from the support position to the traveling position;

a third roller assembly having portions connected to the second ends of the first and the second roller guides and portions for rolling engaging the base as the base is rollingly moved to the support position and to the traveling position, comprising:

a roller connected to the second end of the first roller guide with the roller being positioned to rollingly engage the base as the base is moved to the support position and to the traveling position;

a roller connected to the second end of the second roller guide with the roller being positioned to rollingly engage a portion of the base as the base is moved to the support position and to the traveling position; and wherein the base is rollingly supported between a first and a second roller guide whereby the base is rollingly movably from the storage position to the transport position and the base is supported solely by the first, second and third roller assemblies and the first and the second roller guides during the movement of the porch from the transport position to the storage position and from the storage position to the transport position.

2. The porch of claim 1 wherein the first roller assembly is defined further to include:
   a first roller connected to the first side of the base generally near the first end of the base and adapted to be rollingly disposed in the first roller guide; and
   a second roller connected to the first side of the base and spaced a distance from the first roller, the second roller is rollingly supportable in the first roller guide, the first and the second rollers cooperating to rollingly connect the first side of the base to the first roller guide.

3. The porch of claim 2 wherein the second roller assembly is defined further to include:
   a first roller connected to the second side of the base generally near the first end of the base and adapted to be rollingly disposed in the second roller guide; and
   a second roller connected to the second side of the base and spaced a distance from the first roller, the second roller is rollingly supportable in the second roller guide, the first and the second rollers cooperating to rollingly connect the second side of the base to the first roller guide.

4. The porch of claim 1 wherein the base is defined further as having the first and the second sides and the first and the second ends connected to form a generally rectangularly shaped base, and wherein the base is defined further to include:
   an expanded metal member connected to the base and extending generally between the first and the second sides and generally between the first and the second ends of the base with a portion of the expanded metal member forming the support surface adapted for supporting an individual on the base.

5. The porch of claim 1 wherein the mobile living unit is defined further to include an access opening formed through a portion of the first side of the mobile living unit and wherein a door is disposed in the access opening and wherein the means for movably connecting the base to the lower surface of the mobile living unit is defined further as movably connecting the base to the lower surface of the mobile living unit so the base is positioned generally between the front end and the rear end of the mobile living unit and generally near the door of the mobile living unit and so that in the support position of the base, the base extends a distance from the door and extends a distance generally from opposite sides of the door.

6. The porch of claim 1 wherein the mobile living unit is defined further to include a first frame member extending generally between the front end and the rear end of the mobile living unit with the first frame member forming a portion of the lower surface of the mobile living unit and a second frame member spaced a extending a distance generally between the front end and the rear end of the mobile living unit with the second frame member forming a portion of the lower surface of the mobile living unit, and wherein the means for movably connecting the base to the lower surface of the mobile living unit is defined further as movably connecting the base to the first and the second frame members of the mobile living unit.

7. The porch of claim 6 wherein the first roller guide is defined further as extending generally between the first and the second frame members, and wherein the second roller guide is defined further as extending between the first and the second frame members with a second roller guide being spaced a distance from the first roller guide, and wherein the means for connecting the base to the lower surface of the mobile living unit is defined further to include:
   means for connecting the first roller guide to the first and the second frame members; and
   means for connecting the second roller guide.

8. The porch of claim 1 defined further to include:
   at least one hand rail removably connectable to the base, the hand rail extending a distance in a generally upwardly direction from the base.

9. The porch of claim 1 defined further to include:
   means for moving the base to the support position and to the traveling position.

10. The porch of claim 9 the means for moving the base to the support position and the traveling position is defined further to include a driving assembly comprising:
    a reversible motor;
    a power source connectable to the motor;
    means for connecting the motor to the base; and
    means for connecting the reversible motor to the power source for moving the base in one direction to the support position in one actuated condition of the motor and for moving the base in the opposite direction to the traveling position in one other actuated condition of the motor.

11. The porch of claim 10 wherein the means for connecting the motor to the base is defined further to include:
    roller chain means connected to the base; sprocket means drivingly connected to the roller chain means and being connected to the motor, the sprocket means drivingly engaging the chain to move the base in actuated conditions of the motor.

12. The porch of claim 10 wherein the driving assembly is defined further to include:
    means for disconnecting the motor from the power source in the opened position of the door of the mobile living unit.

13. The porch of claim 10 wherein the driving assembly is defined further to include:
    means for disconnecting the motor from the power source when the base has been moved to the traveling position; and means for disconnecting the motor from the power source when the base has been moved to the support position.

14. The porch of claim 1 defined further to include:
at least one porch support, each porch support being connected to the base generally near the second end of the base and each porch support having a portion engagable with the ground level for cooperating to support the second end of the base a distance above a ground level in the support position of the base.

15. The porch of claim 14 wherein each porch support is defined further to include:
a base;
a first porch support member having one end pivotally connected to the base;
A second porch support member having one end pivotally connected to the end of the first porch support member, opposite the end of the first porch support member connected to the base, and the opposite end of the second porch support member being disposed near the base; and
means for removably connecting the second end of the second porch support member to the base.

16. The porch of claim 15 wherein each porch support is defined further to include:
a bracket connected to the base and having an opening extending therethrough, the first end of the second porch support member extending through the opening in the bracket; and
means for removably connecting the first end portion of the second porch support member to the bracket.

17. A porch adapted for use with a mobile living unit having a front end, a rear end, a first side, a second side, an upper surface and a lower surface wherein the lower surface is supported a distance above ground level in a traveling condition of the mobile living unit, the porch comprising:
a base having a first side, a second side, a first end and a second end, a support surface being formed on the base extending generally between the first side and the second side and generally between the first end and the second end;
means for movably connecting the base to the lower surface of the mobile living unit, the base being movable from a support position to a traveling position wherein the base substantially is disposed under the lower surface of the mobile living unit and the base being movable from the traveling position to a support position wherein the base extends a distance from the first side of the mobile living unit with the support surface on the base being position for supporting an individual thereon; and
at least one porch support, each porch support being connected to the base generally near the second end of the base and each porch support having a portion engageable with the ground level for cooperating to support the second end of the base a distance above a ground level in the support position of the base, each porch support comprising:
a base;
a first porch support member having one end pivotally connected to the base;
a second porch support member having one end pivotally connected to the end of the first porch support member, opposite the end of the first porch support member connected to the base, and the opposite end of the second porch support member being disposed near the base;
means for removably connecting the second end of the second porch support member to the base;
a bracket connected to the base and having an opening extending therethrough, the first end of the second porch support member extending through the opening in the bracket;
means for removably connecting the first end portion of the second porch support member to the bracket; and
wherein each support is defined further as having a support position and a traveling position, the first porch support member being movably through the opening in the bracket with the pin removed from the bracket to a position wherein the first porch support member is disposed generally within the opening in the bracket and the pivotal connection between the first and the second porch support members is disposed generally above the bracket, the first porch support member being movable to the travel position and wherein the first porch support member is disposed generally within the opening in the bracket with the base of the porch support assembly being disposed generally near the base and the first porch support member being disposed generally on the support surface.

* * * * *

UNITED STATES PATENT AND TRADEMARK OFFICE
CERTIFICATE OF CORRECTION

PATENT NO. : 4,869,030
DATED : September 26, 1989
INVENTOR(S) : Lovine L. Clark

It is certified that error appears in the above-identified patent and that said Letters Patent is hereby corrected as shown below:

Column 12, line 10 after the second "a" please insert the phrase --distance from the first frame member and--.

Signed and Sealed this

Fourteenth Day of August, 1990

Attest:

HARRY F. MANBECK, JR.

*Attesting Officer*  *Commissioner of Patents and Trademarks*